(12) United States Patent
DeLand et al.

(10) Patent No.: US 9,095,947 B1
(45) Date of Patent: Aug. 4, 2015

(54) SENSING TIP REAMER (75) Inventors: James A. DeLand, Bothell, WA (US); Matthew G. Kesterson, Everett, WA (US)

(73) Assignee: The Boeing Company, Chicago, IL (US)

( * ) Notice: Subject to any disclaimer, the term of this patent is extended or adjusted under 35 U.S.C. 154(b) by 532 days.

(21) Appl. No.: 13/477,139

(22) Filed: May 22, 2012

(51) Int. Cl.
*B23Q 17/09* (2006.01)
*B23Q 17/22* (2006.01)

(52) U.S. Cl.
CPC .......... *B23Q 17/099* (2013.01); *B23Q 17/2208* (2013.01); *Y10T 408/5584* (2015.01); *Y10T 408/56238* (2015.01); *Y10T 408/8923* (2015.01)

(58) Field of Classification Search
CPC .............. Y10T 408/03; Y10T 408/13–408/15; Y10T 408/20; Y10T 408/44; Y10T 408/45; Y10T 408/558; Y10T 408/5583; Y10T 408/5584; Y10T 408/56238; Y10T 408/8923
USPC ...... 408/1 R, 5–7, 15, 96, 56, 57, 80–82, 201
See application file for complete search history.

(56) References Cited

U.S. PATENT DOCUMENTS

| | | | | |
|---|---|---|---|---|
| 76,188 | A | * 3/1868 | Heath | 175/318 |
| 1,561,463 | A | * 11/1925 | De Rochemont | 408/201 |
| 1,598,655 | A | 9/1926 | Petitjean | |
| 1,985,356 | A | * 12/1934 | Cleef | 82/1.4 |
| 2,224,480 | A | * 12/1940 | Kartarik | 408/81 |
| 2,484,150 | A | * 10/1949 | Brown | 408/204 |
| 3,381,550 | A | 5/1968 | Smith | |
| 3,973,858 | A | 8/1976 | Poisson et al. | |
| 4,056,329 | A | 11/1977 | Perry | |
| 4,180,356 | A | 12/1979 | Hoch | |
| 4,507,025 | A | 3/1985 | Fedor | |
| 4,579,487 | A | * 4/1986 | Lehmkuhl | 409/134 |
| 4,720,218 | A | 1/1988 | DeFries et al. | |
| 4,751,652 | A | 6/1988 | Kiya et al. | |
| 5,000,630 | A | 3/1991 | Riley et al. | |
| 5,171,111 | A | * 12/1992 | Kishimoto | 408/67 |
| 5,316,418 | A | * 5/1994 | Miyanaga | 408/201 |
| 6,250,856 | B1 | * 6/2001 | Miyanaga | 408/57 |
| 2009/0129877 | A1 | 5/2009 | Brady | |

FOREIGN PATENT DOCUMENTS

SU   1199473 A  * 12/1985  ............. B23B 29/03
SU   1386377 A  *  4/1988  ............. B23B 29/03

* cited by examiner

*Primary Examiner* — Daniel Howell
*Assistant Examiner* — Ryan Rufo
(74) *Attorney, Agent, or Firm* — Ostrager Chong Flaherty & Broitman P.C.

(57) ABSTRACT

A system for preventing the performance of an out-of-sequence reaming operation during the machining of holes in a lamination of fiber-reinforced plastic material. The system automatically stops or inhibits a reaming operation if a sensing tip of the reamer encounters an incompletely drilled pre-hole or blank material (i.e., no pre-hole) instead of a fully drilled pre-hole. The system does not require any human intervention to inhibit the reaming operation. In one embodiment, the human or operator cannot re-start the reaming process until the machine tool or reaming equipment is reset. In some cases the reset may require manual intervention.

14 Claims, 8 Drawing Sheets

SENSING TIP REAMER

BACKGROUND

The present disclosure relates generally to the machining of composite material. In particular, this disclosure relates to machining of holes in composite material.

Composite components are being utilized in a wide variety of articles of manufacture due to their high strength and light weight. This is particularly true in the field of aircraft manufacturing. Typical materials used in the manufacture of composite components include glass or graphite fibers that are embedded in resins, such as phenolic, epoxy, and bismaleimide resins. A composite lamination can be built up by laying successive plies of fiber tows (e.g., carbon fiber tows preimpregnated with a thermoset epoxy resin) around a mandrel and then curing. As more advanced materials and a wider variety of material forms have become available, aerospace usage of composites has increased.

Certain machining applications require drilling and/or reaming a hybrid stack-up of materials. A hybrid stack-up of materials may be defined as layers of discontinuous materials such as a carbon fiber-reinforced plastic (CFRP) composite material and titanium, aluminum or steel. For example, certain aircraft require a wing made from a composite material, such as CFRP, be joined to a titanium section of an aircraft body with fasteners that pass through holes made through the mating sections. When using fasteners to attach composite skins to metal substrates, coaxial holes must be drilled in both the skin and an underlying metal substrate. High-quality holes must be produced in such materials with dimensions within narrow tolerances. The wing-to-body join task typically requires a three-step conventional drilling process comprising a pilot drill, followed by a step drill, followed by a finish diameter reamer.

Reamers are cutting tools that are typically used to perform the final cutting operation on holes, particularly holes with small tolerances. Specifically, reamers perform secondary cutting operations after a hole has been drilled close to a desired final size. Reamers therefore typically have an external diameter that is slightly larger than that of the drilled hole, and are designed to finish the hole to within a small tolerance of the desired size and to provide a relatively smooth inner wall.

Standard reamers typically include a shank, a body portion at one end of the shank, and a plurality of teeth, such as 4-8 teeth, that are spaced around the body portion and extend outwardly therefrom to form the cutting surfaces of the reamer. Each tooth includes a rake face and a cutting edge that actually engages the workpiece in the course of reaming a hole. In some cases, the teeth are uniformly spaced around the body portion. In other cases, the teeth have non-uniform or irregular spacing.

During the machining of holes in composite material, severe delamination can occur if a reaming operation is performed prior to a hole being drilled or after a hole has been only partially drilled. The repairs for this kind of damage are very expensive and production flow must be halted until the problem is resolved.

Mechanics use visual inspection and tooling pins to assure that the pre-hole is complete before they move on to the reaming operation. Visual inspection of these holes is difficult in some areas due to limited access and time consuming.

Thus there is a need for a system to inhibit or terminate (without human intervention) the performance of a reaming operation if the pre-hole is missing or other dimensional characteristics do not meet the pre-hole requirements such as depth, diameter, orientation, and location.

SUMMARY

A system is disclosed for preventing the performance of an out-of-sequence reaming operation during the machining of holes in a lamination of fiber-reinforced plastic material. The system automatically stops or inhibits a reaming operation if a sensing tip of the reamer encounters an incompletely drilled pre-hole or blank material (i.e., no pre-hole) instead of a fully drilled pre-hole. The system does not require any human intervention to inhibit the reaming operation. In one embodiment, the human or operator cannot re-start the reaming process until the machine tool or reaming equipment is reset. In some cases the reset may require manual intervention.

A rotary cutting tool is also disclosed that comprises the following elements: (a) a body comprising an internal cavity that extends from one end of the body along an axis, the internal cavity comprising a first portion having a first cross-sectional area and a second portion having a second cross-sectional area less than the first cross-sectional area; (b) a plurality of teeth extending outwardly to form cutting surfaces near another end of the body; (c) a shaft disposed in the internal cavity along the axis, the shaft being movable axially relative to the body; and (d) a sensing tip coupled to or integrally formed with one end of the shaft and disposed outside the internal cavity. A spring, fluid piston or other suitable biasing member may be arranged to resist movement of the shaft from a first position toward a second position. The shaft and the internal cavity are configured so that another end of the shaft is disposed in the first portion of the internal cavity when the shaft is in the first position and is disposed in the second portion of the internal cavity when the shaft reaches the second position.

In addition, a method for using a rotary cutting tool having a leading tip axially movable relative to a plurality of cutting edges is disclosed. The method comprises the following steps: (a) mechanically resisting relative movement of the cutting edges and the leading tip toward each other; (b) actuating a drill motor that rotates the cutting edges; (c) advancing the rotating cutting edges forward along an axis of a pre-hole; (d) monitoring a parameter to determine when the value of that parameter reaches a specified threshold corresponding to the cutting edges advancing a specified distance relative to the leading tip after the latter has stopped advancing; and (e) stopping the rotation and advancement of the cutting edges when the value of the parameter reaches the specified threshold. The leading tip is carried by a shaft that is axially movable inside a body that carries the cutting edges. In a particular embodiment, the monitored parameter may be associated with a fluid that is ported or supplied to the body at an opening proximate to one end thereof. The fluid parameter monitored may correspond to a rate of flow of fluid through the body or a pressure in the line supplying fluid to the body. Step (e) is performed when the shaft position causes the fluid parameter to reach a threshold value.

Another aspect of the disclosed subject matter is a system comprising: a source of fluid; a rotary cutting tool comprising a plurality of cutting edges, a forward tip axially movable relative to the cutting edges, an inlet, an internal cavity in fluid communication with the inlet, and means for biasing the tip and cutting edges toward moving apart, wherein the forward tip is movable between a first position where the forward tip does not reduce the flow of fluid through the internal cavity and a second position where the forward tip reduces the flow of fluid through the internal cavity; a motor coupled to the rotary cutting tool for driving rotation of the cutting edges; a shutoff device for shutting off the motor; a subsystem for guiding the flow of fluid from the fluid source to the inlet of the rotary cutting tool, the subsystem comprising a sensor capable of producing a signal when a value of a parameter of the fluid reaches a specified threshold; and a controller coupled to the sensor for receipt of the signal from the sensor, the controller being programmed to output a shutoff signal to the shutoff device in response to receipt of the signal from the sensor. For example, the sensor can be a flow sensor or a fluid pressure sensor.

A further aspect is a system comprising: a reamer comprising an axial internal cavity having first and second openings at first and second ends of the reamer and a plurality of teeth extending outwardly to form cutting surfaces near the first end of the reamer, the internal cavity comprising a first portion having a first cross-sectional area and a second portion having a second cross-sectional area less than the first cross-sectional area; a sensor capable of producing a signal when a value of a parameter reaches a specified threshold; a flow path connecting the sensor to the second opening of the reamer; a shaft disposed in the internal cavity, the shaft being movable axially relative to the reamer from a first position toward a second position; and a tip coupled to or integrally formed with another end of the shaft and disposed outside the internal cavity. The shaft and the internal cavity are configured so that another end of the shaft is disposed in the first portion of the internal cavity when the shaft is in the first position and is disposed in the second portion of the internal cavity when the shaft reaches the second position, a flow through the internal cavity being reduced when the shaft moves from the first position to the second position.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

The system disclosed herein is designed to prevent the running of a reaming operation prior to drilling the necessary pre-hole in CFRP material. A reaming technology is provided that will not harm the CFRP structure if a reamer were used out of sequence. A reamer having a sensing tip is installed in a powered drill motor that may be powered electrically, by pressurized air or other known means. The system shuts off the drill motor if the tip of the reamer encounters blank material. The system employs a control that shuts off the drill motor when a fluid parameter associated with a coolant or lubricant flowing through the reamer is restricted due to depression (relative to the reamer cutting edges) of the sensing tip, which is axially movable relative to the cutting edges of the reamer. The coolant or lubricant may comprise a liquid, gas, or mixture of liquid and gas such as a mist coolant or lubricant. Suitable gases may include air, inert gas or refrigerant. Depression of the sensing tip occurs when the tip meets blank material or an obstacle inside an incompletely drilled pre-hole while the cutting portion of the reamer continues to advance. If the tip is depressed by an amount sufficient to cause the magnitude of the monitored fluid parameter to reach a specified threshold, the control causes a shutoff valve to close in the case of an air-powered drive or opens a switch in the case of an electric drive, thereby stopping rotation and advancement, or advancement, of the reamer. The control may also shut down the metering pumps that provide air/coolant to the reamer. The system inhibits a reaming operation when blank or partially drilled material is encountered.

Figure 1:
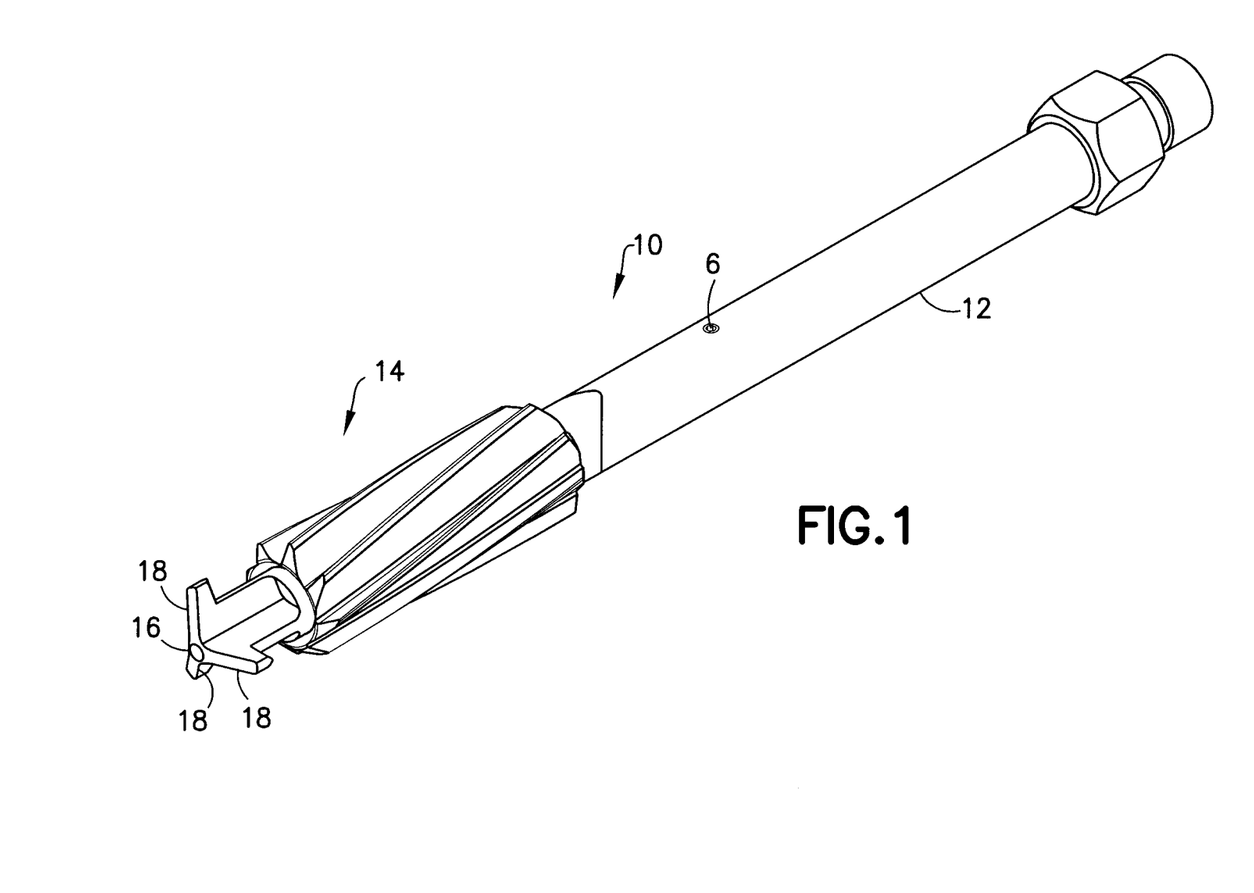
FIG. 1 is a diagram showing an isometric view of a sensing tip reamer in accordance with one embodiment.

FIG. 1 shows an isometric view of a rotary cutting tool in accordance with one embodiment. The tool comprises reamer 10 and an integrally formed sensing tip/shaft comprising a sensing tip 16 and a shutoff shaft. The shutoff shaft is not visible in FIG. 1 because it is inside the reamer 10. The reamer 10 comprises a hollow body 12 having an internal cavity (not shown in FIG. 1) that extends from a forward end to a rearward end along a central axis. The reamer 10 further comprises a plurality of teeth 14 extending outwardly to form cutting surfaces near the forward end of hollow body 12. The cutting edges define an outer diameter of the reamer 10.

Figures 2, 3, 4:
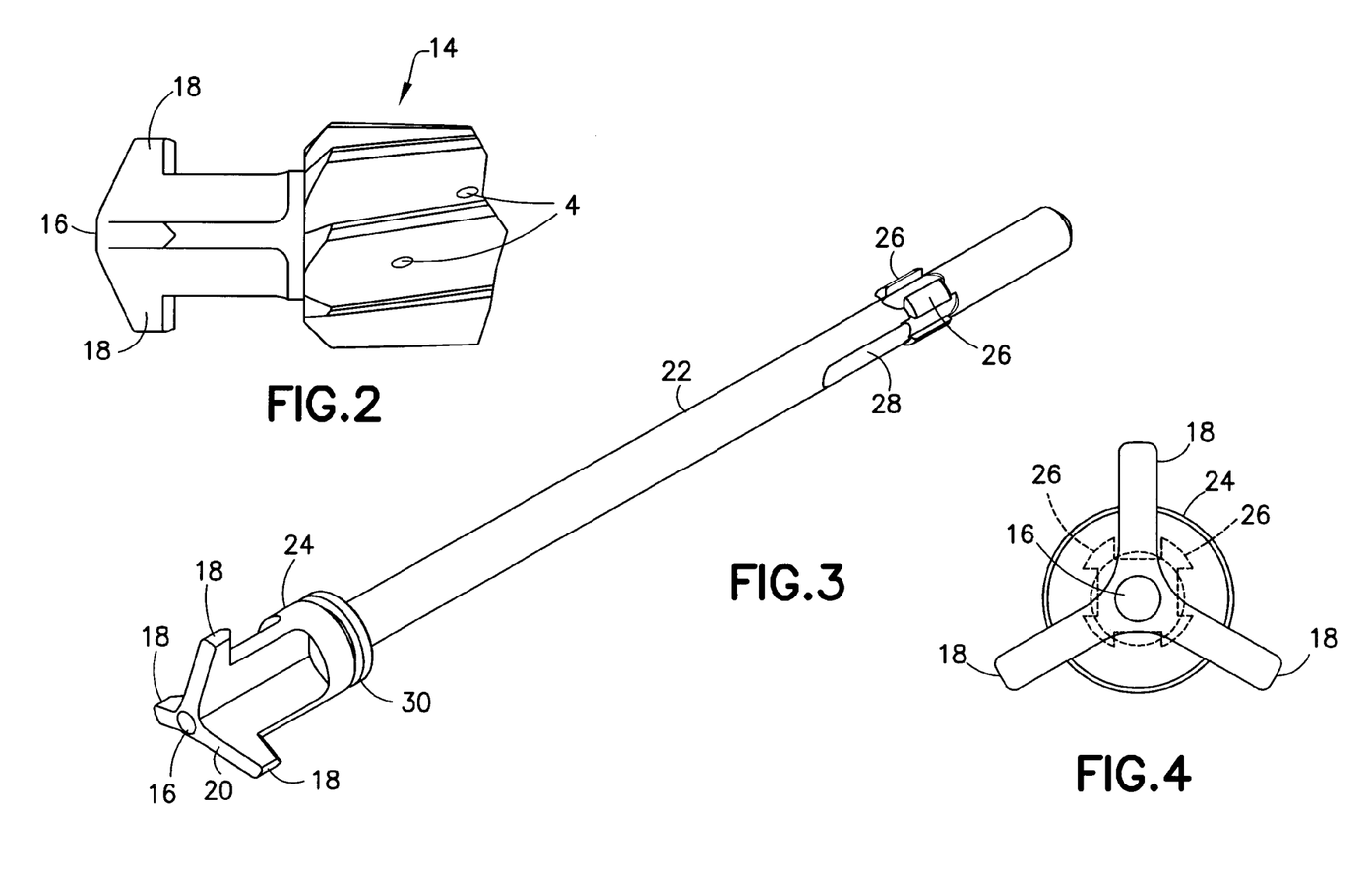
FIG. 2 is a diagram showing a side view (magnified in scale) of the distal end of the sensing tip reamer depicted in FIG. 1.
FIG. 3 is a diagram showing an isometric view of the sensing tip partly depicted in FIG. 1.
FIG. 4 is a diagram showing an end view of the sensing tip.

FIG. 2 shows (on a magnified scale) the sensing tip 16 in its most forward position relative to reamer 10. The sensing tip 16 comprises three contact arms 18 disposed radially outward at angles of 120 degrees. If any portion of the sensing tip 16 encounters an obstacle during reaming of a pre-hole, the sensing tip as seen in FIG. 2 will move to the right relative to the cutting teeth 14. In one specific implementation, the diameter of a hypothetical circle around the contact arms 18 may be in the range of 0.005 to 0.100 inch smaller than the reamer outer diameter. The tip 16 is relieved to minimize any impact to chip flow. In that same implementation, the tip is made of stainless steel.

FIG. 2 also shows that each flute between cutting teeth 14 is provided with one or more vent holes 4. As will be described in more detail below with reference to FIG. 5, a jet spray of droplets of coolant suspended in air will flow through an internal cavity of the reamer and exit the reamer via the vent holes 4, thereby cooling the cutting teeth 14 during the reaming operation.

The integrally formed sensing tip/shaft is shown removed from the reamer in FIG. 3. The contact arms 18 of sensing tip 16 are machined with a tri-lobed contact surface 20, each lobe disposed at a 135-degree angle. The integrally formed sensing tip/shaft further comprises a shutoff shaft 22. The shutoff shaft 22 comprises a guide body 24, a plurality of circumferentially distributed, radially projecting guide features 26 and a retention slot 28. FIG. 4 shows an end view as seen from a vantage forward of the sensing tip 16. The guide body 24 has an annular groove that receives a seal such as an O-ring 30. The guide body 24 has an outer diameter greater than the outer diameter of the main portion of the shutoff shaft 22.

Figure 5:
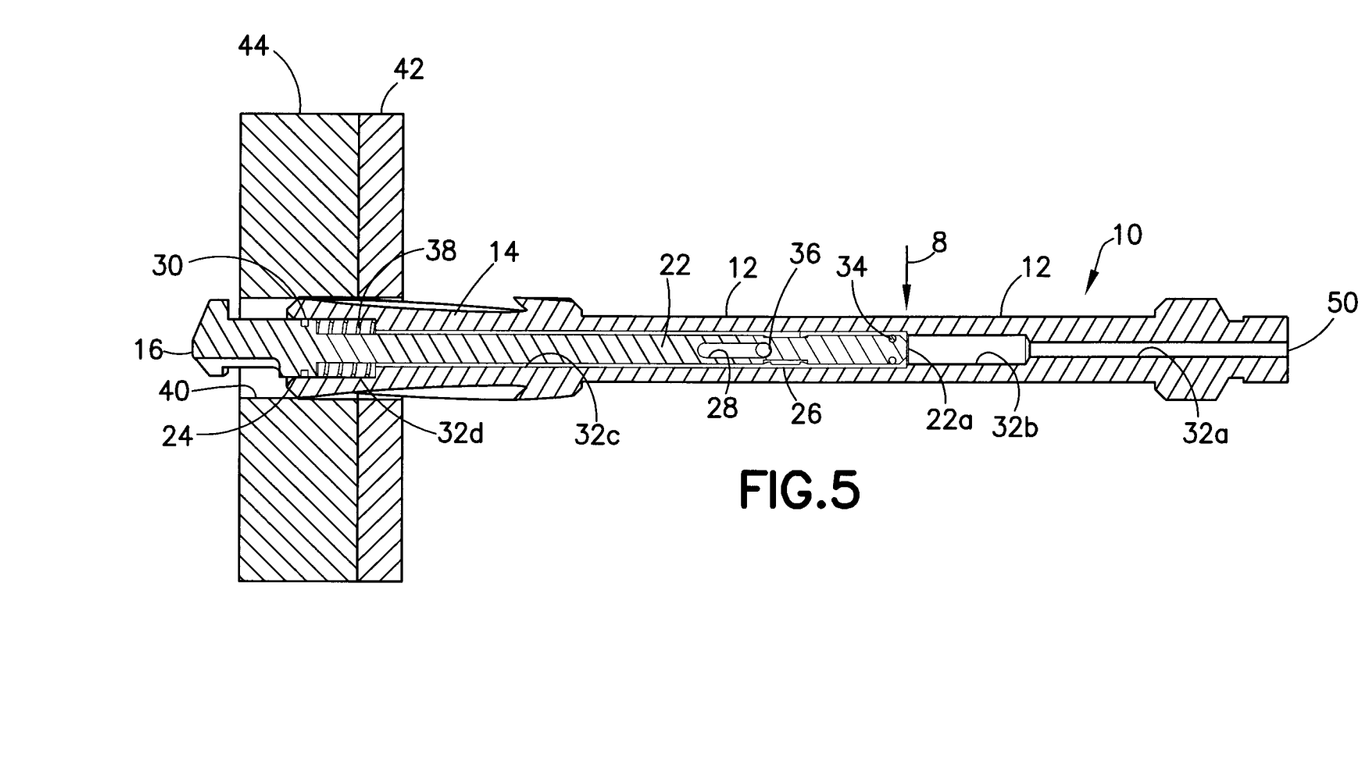
FIG. 5 is a diagram showing a sectional view of a sensing tip reamer (of the type depicted in FIG. 1) during reaming a completed hole in a metal/composite stack-up.

FIG. 5 is a sectional view showing a sensing tip reamer (of the type depicted in FIG. 1) during reaming a completed hole 40 in a stack-up consisting of metal 42 and composite material 44. In the example depicted in FIG. 5, during advancement of the reamer 10, the sensing tip 16 did not make contact with any obstacle inside completed pre-hole 40, so the reaming operation did not need to be aborted. In other words, the entire pre-hole 40 was reamed completely.

FIG. 5 shows the internal structure of the reamer 10 and how shutoff shaft 22 is disposed inside the reamer internal cavity. The internal cavity comprises four circular cylindrical bores 32a through 32d which increase in diameter from right to left (as seen in FIG. 5). A jet spray of air and suspended droplets of liquid coolant enters section 32a of the internal cavity via an opening 50 at the rear end of the hollow body 12 of reamer 10. The air/coolant jet flows through sections 32a, 32b and 32c, exiting the hollow body 12 through the aforementioned vent holes (not shown) between the cutting teeth 14. As seen in FIG. 5, the guide features 26 hold the shutoff shaft 22 in a central position inside section 32c of the internal cavity of reamer 10. The outer diameter of the guide features 26 is greater than the outer diameter of shutoff shaft 22, creating an annular space between the outer surface of shutoff shaft 22 and the inner surface of section 32c. The air/coolant flows through this annular space on its way to the vent holes (see items 4 in FIG. 2) located between the cutting teeth 14.

To assemble the sensing tip reamer, the shutoff shaft 22 is inserted into the internal cavity of hollow body 12 and then a set screw 36 is passed through the retention slot 28 in shutoff shaft 22, the ends of the set screw being threadably coupled in diametrally opposed threaded holes (one such hole 6 can be seen in FIG. 1) formed in the wall of the hollow body 12. The set screw 36 retains the shutoff shaft 22 inside the hollow body 12 but, in cooperation with elongated axial slot 28 formed in shutoff shaft 22, allows the shutoff shaft 22 to move axially between first and second limit positions relative to the hollow body. FIG. 5 depicts shutoff shaft 22 in the first limit position, further axial movement rearward being stopped by impingement of the rearward end of slot 28 against set screw 36. The sensing tip/shaft 16 is urged into the relative position seen in FIG. 5 by a compression spring 38 which is placed between respective annular surfaces on the guide body 24 and on the hollow body 12. In the absence of a force depressing the sensing tip, the sensing tip/shaft will remain in the relative position shown in FIG. 5. In this relative axial position, the rear end 22a of shutoff shaft 22 does not enter section 32b of the reamer internal cavity as seen in area 8.

In accordance with alternative embodiments, the compression spring 38 can be omitted and the shutoff shaft 22 can be pressure biased in the forward direction by the coolant flowing into the internal cavity of the reamer. The forces on the shutoff shaft 22 are unbalanced and bias the shaft to the extended position when coolant pressure is present.

Figure 6:
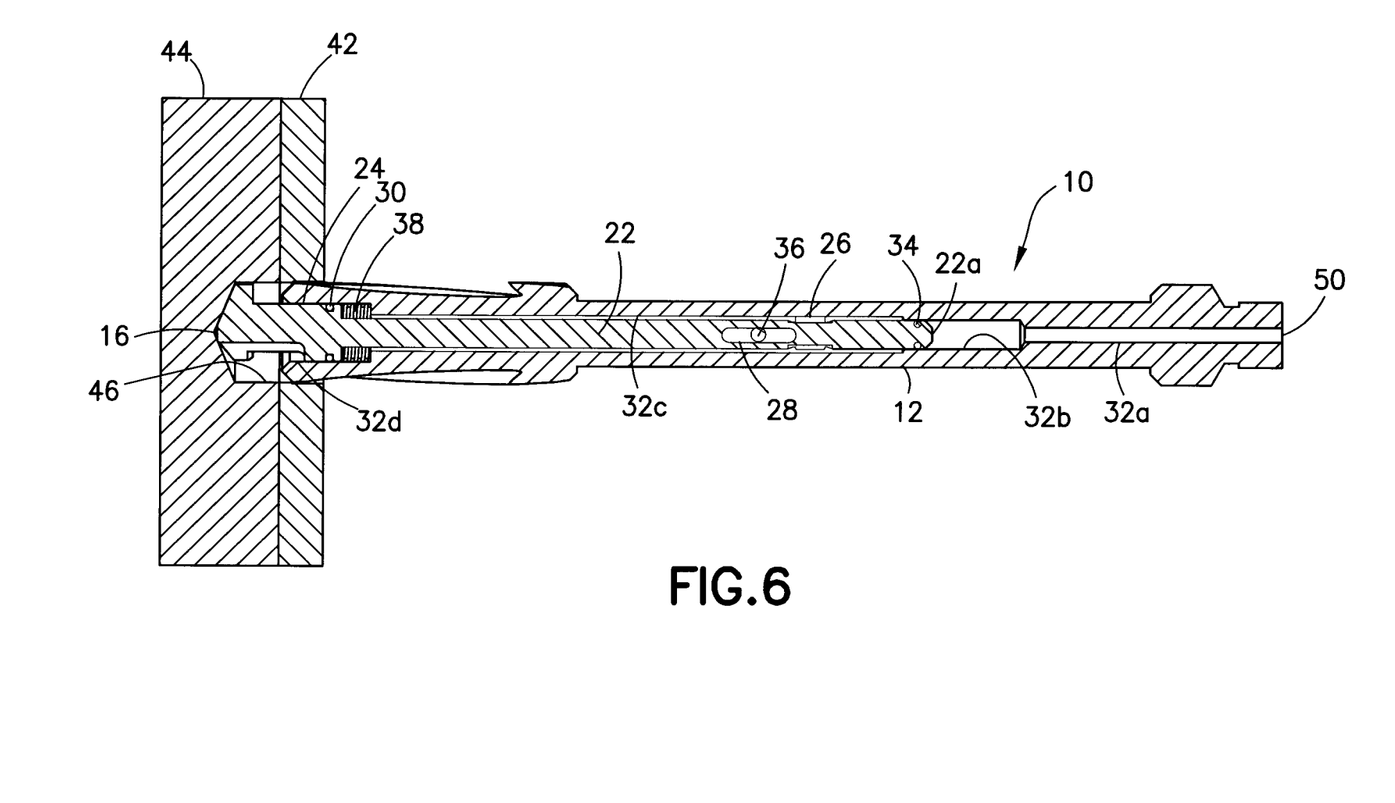
FIG. 6 is a diagram showing a sectional view of a sensing tip reamer (of the type depicted in FIG. 1) which has been shut down in response to the sensing tip impinging on the bottom of a partially drilled pre-hole in composite material of a metal/composite stack-up.

In contrast, FIG. 6 shows a sectional view of the same sensing tip reamer depicted in FIG. 5, except that the sensing tip reamer has been inserted in a partially drilled pre-hole 46 (closed at the bottom) in the metal/composite stack-up 42/44. When tip 16 impinges against the blank bottom of incomplete pre-hole 46, the sensing tip/shaft ceases to advance while the reamer 10 continues its advance. The result is that the sensing tip/shaft moves rearward relative to reamer 10. In particular, the end 22a of shutoff shaft 22 moves axially past position 8 and into section 32b of the reamer internal cavity. The end portion near end 22a which enters section 32b has an annular groove in which an O-ring 34 is seated. Because the diameter of section 32b is less than the diameter of section 32c, where shutoff end 22a previously resided, the cross-sectional area of the annular space between the shaft end 22a and the internal cavity is reduced. In addition, the O-ring 34 further reduces the amount of air/coolant that can flow axially from section 32b into section 32c. The result of the rearward movement of the shaft into section 32b of the reamer internal cavity is a reduction in the rate of air/coolant flow through the reamer (accompanied by a pressure increase in the line feeding air/coolant to the reamer). In other embodiments the O-ring 34 and the annular groove that it sits in can be omitted and a clearance fit between the rear end 22a of shutoff shaft 22 and section 32b can be provide which is capable of causing a suitable reduction in the rate of air/coolant flow through the reamer when rear end 22a is engaged with section 32b. As will be explained in more detail later, this reduction in the fluid flow rate (or increase in pressure) is detected by the system. In response to the fluid flow rate falling below a specified threshold (or the pressure increasing above a specified threshold), the supply of pressurized air to the drill motor is shut off and the reaming operation is automatically aborted. FIG. 6 shows the shutoff shaft 22 in a third position relative to the hollow body 12, which third position is between the first and second limit positions.

Figure 7:
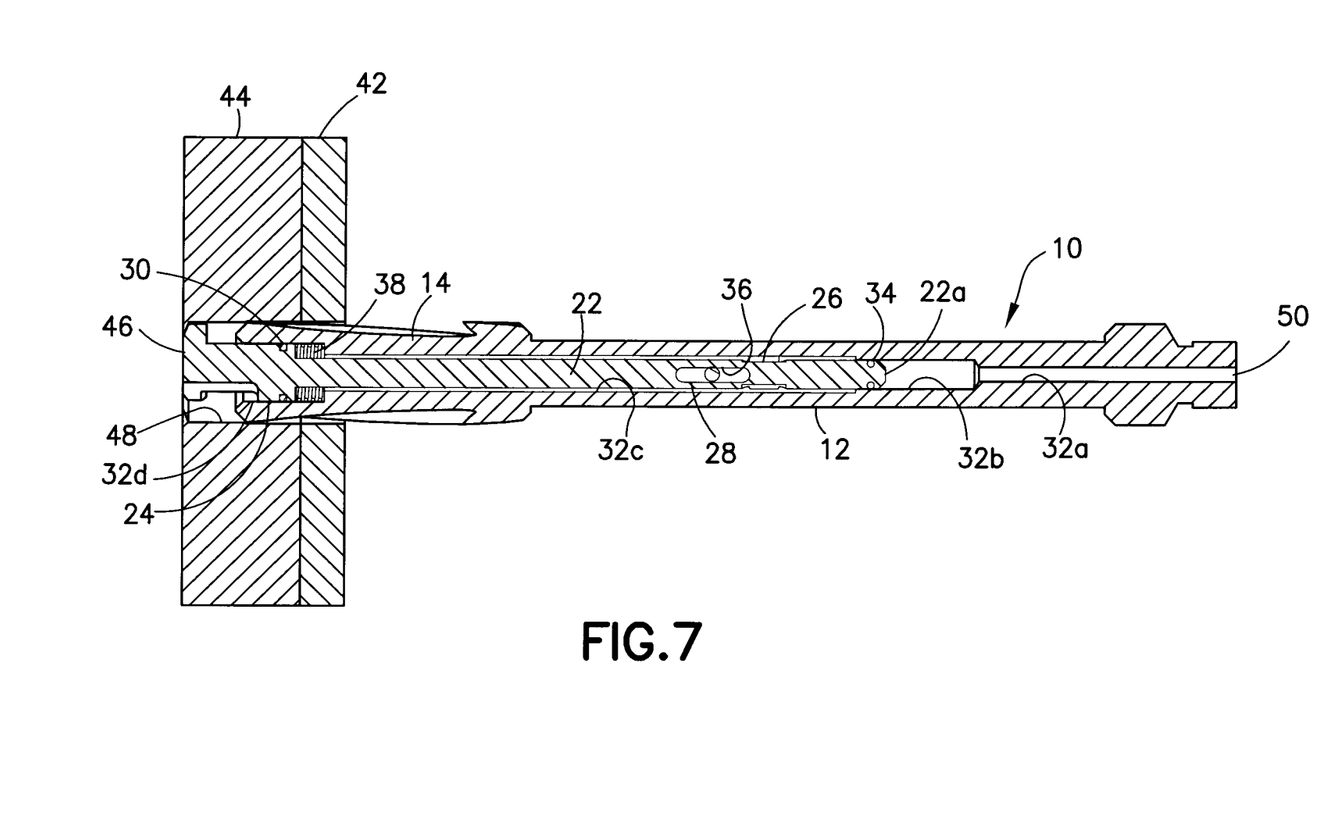
FIG. 7 is a diagram showing a sectional view of a sensing tip reamer (of the type depicted in FIG. 1) which has been shut down in response to the sensing tip impinging on composite material in and at the end of a hole that is slightly short (e.g., 0.050 inch) of being completed.

FIG. 7 shows a sectional view of the same sensing tip reamer depicted in FIG. 5, except that the sensing tip reamer has been inserted in an incompletely drilled pre-hole 46 that is only a small distance (e.g., 0.050 inch) short of a completed hole. When tip 16 impinges against the undrilled material at the exit side of the incomplete pre-hole 46, the sensing tip/shaft again ceases to advance while the reamer 10 continues its advance. The result is that the sensing tip/shaft will again move rearward relative to reamer 10, eventually aborting the reaming operation.

Figure 8:
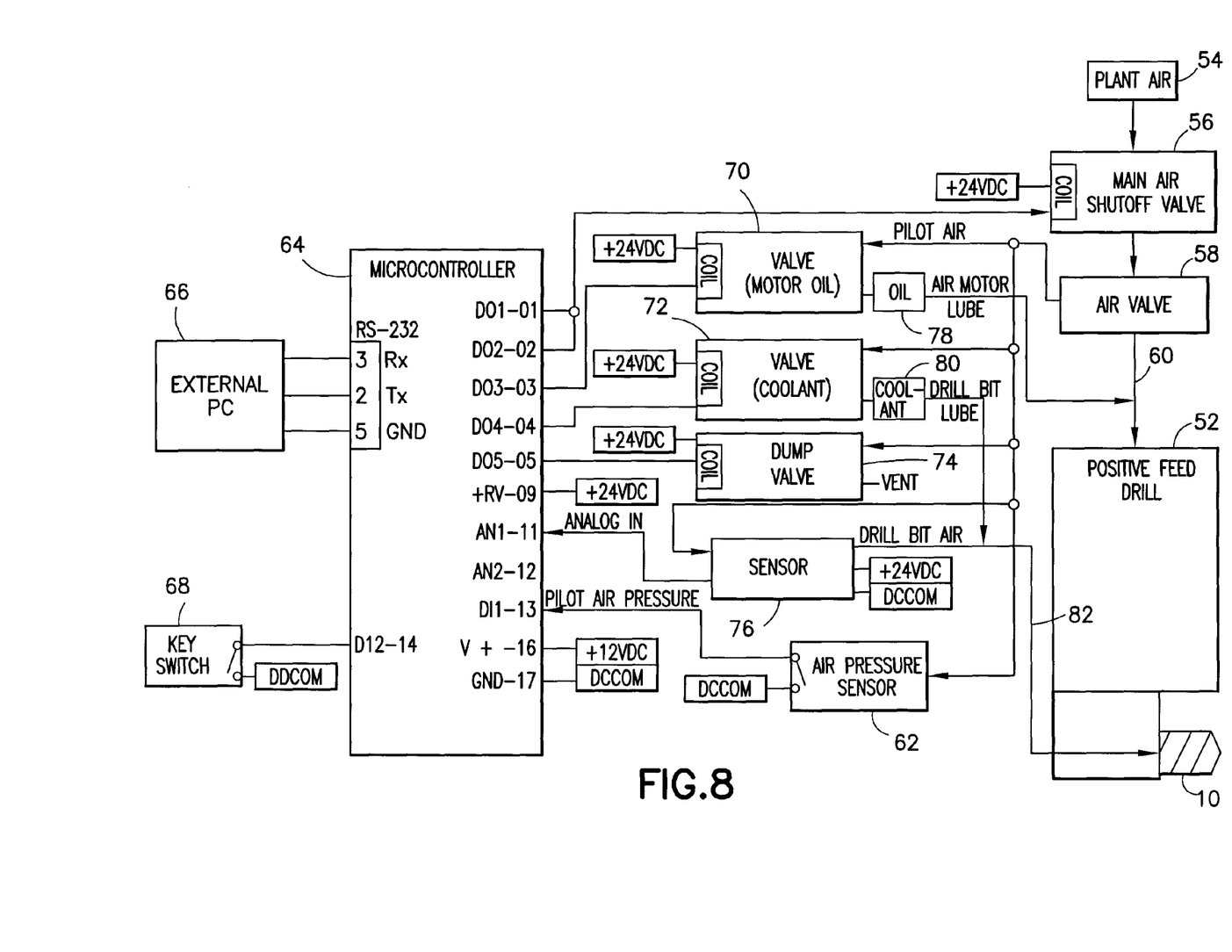
FIG. 8 is a hardware block diagram showing components of a system that incorporates a sensing tip reamer of any type disclosed herein.

FIG. 8 is a block diagram showing components of a system providing the functionality described above. The reamer 10 is coupled to a positive feed drill 52 (e.g., a Quackenbush positive feed drill) having a pneumatic motor. The pneumatic motor of drill 52 is powered by pressurized air from a plant air source 54 via a solenoid-actuated main air shutoff valve 56 and an air valve $58_{[DMFI]}$. The operational state of shutoff valve 56 is controlled by a microcontroller 64 which can activate/deactivate a solenoid to respectively open/close the shutoff valve 56. The microcontroller 64 can be programmed using an external personal computer 66. When the system is in a locked state (i.e., key switch 68 is open), the system can be activated only by using a key to close key switch 68.

When the system is activated, the microcontroller first opens the shutoff valve 56. Pressurized air flows through shutoff valve 56 to air valve 58. Some of the air flow (indicated by a line labeled "PILOT AIR" in FIG. 8) is diverted to an air distribution system that distributes pilot air to solenoid-actuated valves 70, 72, 74 and an air pressure sensor 62. The air pressure sensor 62 outputs a digital signal representing the pilot air pressure to the microcontroller 64.

When the pilot air pressure reaches a first specified threshold, the microcontroller 64 is programmed to open valves 70 and 72, thereby supplying pilot air respective air pulse generators (not shown) which are used to send pulses of air to activate pistons of respective metering pumps (also not shown) that respectively meter motor oil and coolant from respective reservoirs 78 and 80. If the pilot air pressure reaches a second specified threshold (higher than the first specified threshold and corresponding to a pressure buildup if no air is being supplied to the drill motor), the microcontroller is programmed to open a dump valve 74 to equalize the system.

FIG. 8 depicts the delivery of motor oil via a capillary tube (labeled "AIR MOTOR LUBE" in FIG. 8) to an air line 60 connected to air valve 58. The motor oil is metered by a metering pump (not shown in FIG. 8) coupled to an outlet of an oil reservoir 78. In one implementation, the metering pump is an adjustable-stroke piston pump. As previously described, pilot air from air valve 58 is provided via open valve 70 to an air pulse generator (not shown) that sends pulses of air to activate the motor oil metering pump.

The pilot air is also received by a sensor 76. In accordance with one embodiment, sensor 76 is a flow sensor that outputs an analog signal (0 V to 5 V) representing the rate of air flow through the sensor to the microcontroller 64. (When there is no flow, the output of the sensor is 0 V.) In accordance with an alternative embodiment, sensor 76 is a fluid pressure sensor. The air (labeled "DRILL BIT AIR" in FIG. 8) flowing out of sensor 76 is supplied to the drill bit, i.e., reamer 10, via an air line 82. FIG. 8 also depicts the delivery of lubricant (e.g., Micro-cut 26 coolant or Boelube oil) through a capillary tube (labeled "DRILL BIT LUBE" in FIG. 8) to line 82, which feeds the air and lubricant to the reamer 10. In one implementation, the lubricant (coolant or oil) is supplied to the reamer 10 via a ⅜-inch line for air with a ⅛-inch capillary for lubricant inside. In the implementation depicted in FIG. 8, the lubricant is Micro-cut 26 coolant. The coolant is delivered by a metering pump (not shown in FIG. 8) coupled to an outlet of a coolant reservoir 80. Again the metering pump is an adjustable-stroke piston pump. The valve 72 (under the control of microcontroller 64) opens pilot air from air valve 58 to an air pulse generator (not shown) that sends pulses of air to activate the coolant metering pump.

As previously described, following the actuation of the drill motor, a pre-hole in a composite/metal stackup can be reamed by the rotating cutting teeth of the advancing reamer 10. In accordance with a flow sensor embodiment, the flow sensor output to the microcontroller is monitored to determine if the flow rate of air through the reamer has been sufficiently reduced due to obstruction of the sensing tip. The microcontroller is programmed to actuate closure of shutoff valve 56 as well as motor oil and coolant valves 70 and 72 in response to the air flow rate falling below a specified threshold. In accordance with a pressure sensor embodiment, the pressure sensor output to the microcontroller is monitored to determine if the air pressure in the supply line has increased sufficiently due to obstruction of the sensing tip. In this case, the microcontroller is programmed to actuate closure of shutoff valve 56 as well as motor oil and coolant valves 70 and 72 in response to the air pressure rising above a specified threshold.

Figure 9:
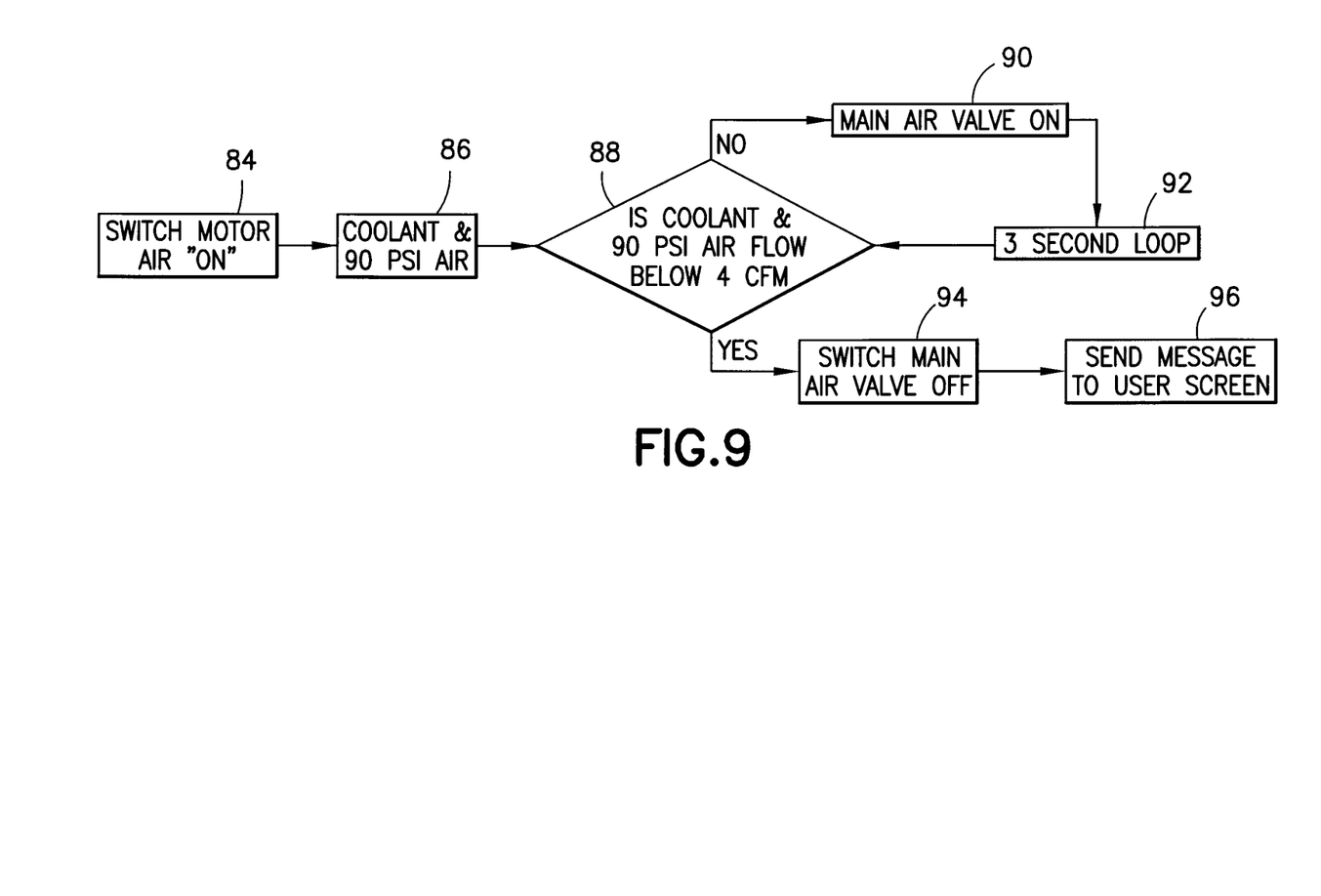
FIG. 9 is a logic diagram showing steps of a process for automated shutdown of a reamer if a condition indicating an incomplete hole is detected.

One implementation of a method of aborting a reaming operation is depicted in the logic diagram of FIG. 9. First, the motor air supply is turned on (step 84). Then the coolant valve 72 is opened. Pressurized air (90 psi) and coolant are then supplied to the reamer (step 86). The air flow rate is measured by the flow sensor, which outputs an analog signal representing the air flow rate to the microcontroller. The microcontroller continuously monitors whether the coolant/air flow rate has fallen below 4 cfm (step 88). If not, then the main air shutoff valve is not closed (step 90). The 3-second loop 92 is the time the system takes to detect that a drop in flow has occurred. This is an adjustable setting in the system software. The setting should be selected to avoid any momentary events that may trigger a shutoff and still stop the system in time to mitigate any damage to the workpiece to be reamed. If the coolant/air flow rate has fallen below 4 cfm, then the main air shutoff valve is switched from open to closed (step 94). The microcontroller then sends a message to a user screen displayed on a personal computer (step 96).

Referring back to FIG. 8, the key switch 68 is a reset feature used after the system encounters an undersize or blank hole condition. It is preferred to keep this functionality away from the reamer operator so that he/she cannot not simply reset the system without removing the drill motor from the drill jig. The reset key resides with the drill motor set-up technician. This forces the operator to take a step back from the process to determine why the system tripped.

In the embodiment shown in FIGS. 3 and 4, the sensing tip and shutoff shaft were integrally formed. In accordance with an alternative embodiment depicted in FIG. 10, a sensing tip 100 is removable and rotatably coupled to one end of a shutoff shaft 98. The rotating sensing tip 100 has two contact arms 18 and comprises a plug 102 having an annular groove. The plug 102 of sensing tip 100 is inserted into a socket 104 formed in a guide body 106 at one end of shutoff shaft 98. The plug 102 is coupled to the socket 104 by inserting a slotted spring pin 108 into a radial opening in the socket wall. The radially inward end of slotted spring pin 108 sits in the annular groove 102 of the sensing tip 100. This arrangement allows the sensing tip 100 to rotate relative to the shutoff shaft 98 while being coupled for axial movement therewith.

Figure 10:
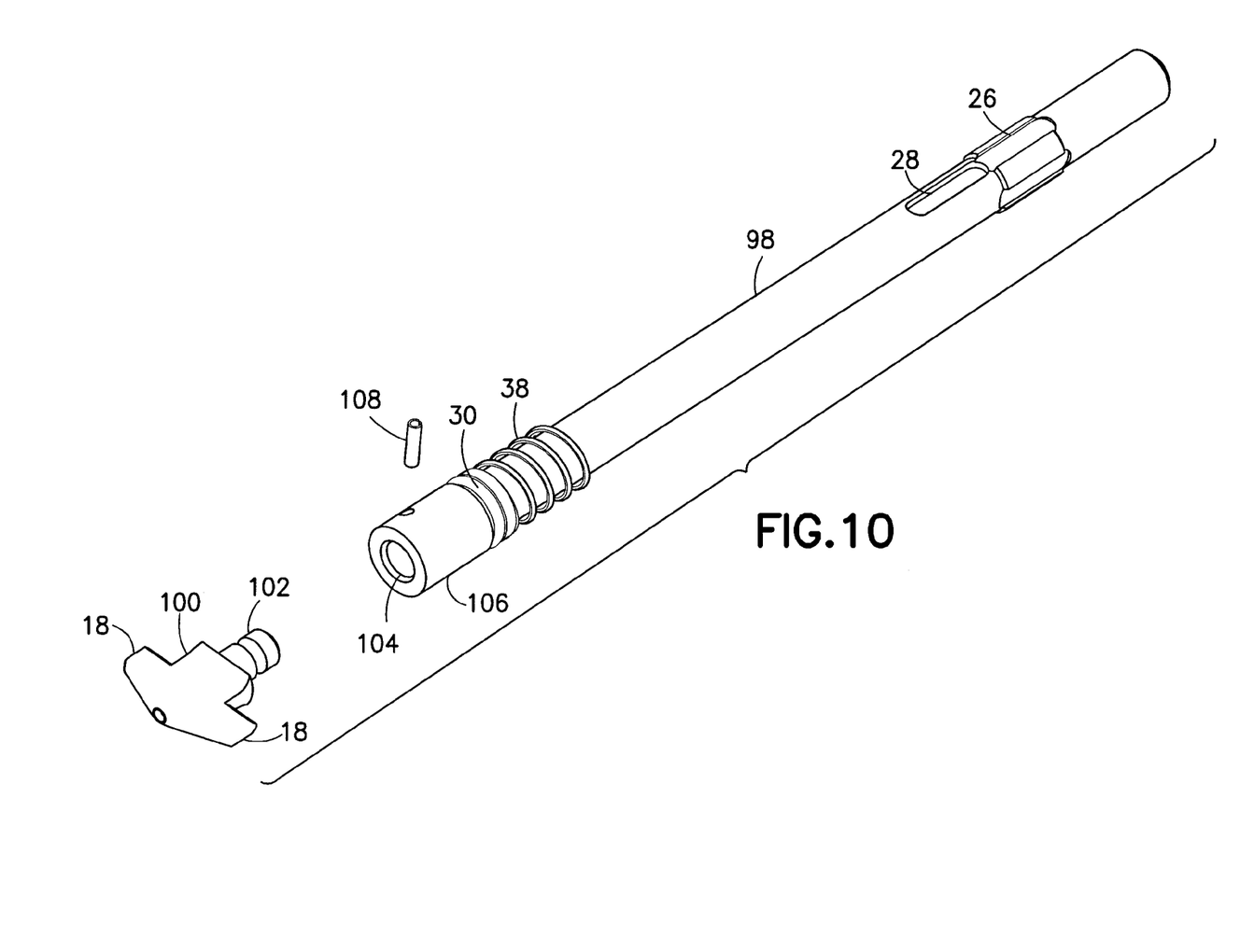
FIG. 10 is a diagram showing an isometric view of a sensing tip in accordance with another embodiment.

As in the earlier-described embodiment, the shutoff shaft 98 has a plurality of circumferentially distributed, radially projecting guide features 26 and a retention slot 28. The guide body 106 has an annular recess that receives an O-ring 30. The guide body 106 has an outer diameter greater than the outer diameter of the shutoff shaft 98, providing an annular bearing surface for the spring 38 which urges the shutoff shaft and the reamer in opposite directions.

While a sensing tip reamer has been described with reference to various embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiments.

In particular, a sensing tip arranged to block the flow of an air-coolant mixture to a reamer or drill when confronted by an obstruction is not limited to use with pneumatic drilling systems, but rather could also be incorporated in electrical drilling systems. In such embodiments, instead of closing a shutoff valve, thereby shutting down the drill motor, in response to rearward relative displacement of the sensing tip, the electrical drilling system would simply be shut down by changing the state of an electrical switch.

The method claims set forth hereinafter should not be construed to require that the steps recited therein be performed in alphabetical order or in the order in which they are recited. Nor should they be construed to exclude any steps being performed concurrently.

The invention claimed is:

1. A rotary cutting tool comprising:
   a body comprising an internal cavity extending from one end of said body along an axis, said internal cavity comprising a first portion having a first cross-sectional area, a second portion having a second cross-sectional area less than said first cross-sectional area, and a third portion having a third cross-sectional area less than said second cross-sectional area, said second portion being between said first and third portions;

a plurality of teeth extending outwardly from said one end of said body;

a shaft disposed in said internal cavity along said axis, said shaft being movable axially relative to said body between first and second positions, wherein said shaft comprises a guide body slidably seated in said first portion of said internal cavity when said shaft is in said first and second positions, and an end portion which closes said third portion of said internal cavity when said shaft is in said first position and does not close said third portion of said internal cavity when said shaft is in said second position; and a tip coupled to or integrally formed with said guide body of said shaft and disposed outside said internal cavity.

2. The tool as recited in claim 1, wherein said internal cavity further comprises a fourth portion having a fourth cross-sectional area less than said third cross-sectional area, said third portion being between said second and fourth portions.

3. The tool as recited in claim 1, wherein said shaft comprises a plurality of circumferentially distributed, radially projecting guide features which are slidably disposed in said second portion of said internal cavity.

4. The tool as recited in claim 1, further comprising a plurality of vent holes between said teeth.

5. The tool as recited in claim 1, further comprising means for limiting axial movement of said shaft so that said shaft is axially movable only between said first and second positions.

6. The tool as recited in claim 1, wherein said shaft comprises an axial slot, further comprising a pin that passes through said axial slot and is affixed to said body, a length of said axial slot being greater than a diameter of said pin.

7. The tool as recited in claim 1, further comprising a biasing device arranged to resist movement of said shaft from said first position to said second position.

8. The tool as recited in claim 1, wherein said tip is removable and rotatably coupled to said shaft.

9. The tool as recited in claim 1, wherein said guide body comprises a first annular surface, and said body comprises a second annular surface, further comprising a compression spring disposed between said first and second annular surfaces.

10. The tool as recited in claim 1, wherein said guide body and said tip are integrally formed.

11. The tool as recited in claim 1, wherein said tip comprises a plurality of radially projecting contact arms.

12. A rotary cutting tool comprising:
a body comprising an internal cavity extending from one end of said body along an axis, said internal cavity comprising a first portion having a first cross-sectional area and a second portion having a second cross-sectional area less than said first cross-sectional area;

a plurality of teeth extending outwardly to form cutting surfaces near another end of said body;

a shaft disposed in said internal cavity along said axis, said shaft being movable axially relative to said body from a first position toward a second position; and a tip coupled to or integrally formed with one end of said shaft and disposed outside said internal cavity, wherein said shaft and said internal cavity are configured so that another end of said shaft is disposed in said first portion of said internal cavity when said shaft is in said first position and said another end of said shaft is disposed in said second portion of said internal cavity when said shaft reaches said second position, and wherein said shaft comprises a plurality of circumferentially distributed, radially projecting guide features which are slidably disposed in said first portion of said internal cavity.

13. The tool as recited in claim 12, wherein said guide features have an outer diameter greater than an outer diameter of said shaft, creating an annular space between an outer surface of said shaft and an inner surface of said first portion of said internal cavity.

14. A rotary cutting tool comprising:
a body comprising an internal cavity extending from one end of said body along an axis, said internal cavity comprising a first portion having a first cross-sectional area and a second portion having a second cross-sectional area less than said first cross-sectional area;

a plurality of teeth extending outwardly to form cutting surfaces near another end of said body;

a shaft disposed in said internal cavity along said axis, said shaft being movable axially relative to said body from a first position toward a second position; and a tip coupled to or integrally formed with one end of said shaft and disposed outside said internal cavity, wherein said shaft and said internal cavity are configured so that another end of said shaft is disposed in said first portion of said internal cavity when said shaft is in said first position and said another end of said shaft is disposed in said second portion of said internal cavity when said shaft reaches said second position, said another end of said shaft has an outer diameter less than a diameter of said second portion of said internal cavity, and said another end of said shaft has an annular groove, and wherein said tool further comprises an O-ring which is seated in said annular groove, whereby said O-ring will be disposed in said first portion of said internal cavity when said shaft is in said first position and in said second portion of said internal cavity when said shaft is in said second position.

* * * * *